(12) United States Patent
Forestier

(10) Patent No.: US 9,746,682 B2
(45) Date of Patent: Aug. 29, 2017

(54) SPECTRAL SEPARATION COMPONENT WITHOUT A VISIBLE GHOST IMAGE

(71) Applicant: THALES, Courbevoie (FR)

(72) Inventor: Bertrand Forestier, Paris (FR)

(73) Assignee: THALES, Courbevoie (FR)

( * ) Notice: Subject to any disclaimer, the term of this patent is extended or adjusted under 35 U.S.C. 154(b) by 188 days.

(21) Appl. No.: 14/649,503

(22) PCT Filed: Nov. 28, 2013

(86) PCT No.: PCT/EP2013/074921
§ 371 (c)(1),
(2) Date: Jun. 3, 2015

(87) PCT Pub. No.: WO2014/086649
PCT Pub. Date: Jun. 12, 2014

(65) Prior Publication Data
US 2016/0216525 A1 Jul. 28, 2016

(30) Foreign Application Priority Data

Dec. 5, 2012 (FR) ...................... 12 03297

(51) Int. Cl.
G02B 27/14 (2006.01)
G01J 3/12 (2006.01)
(Continued)

(52) U.S. Cl.
CPC ............ *G02B 27/141* (2013.01); *G01J 3/021* (2013.01); *G01J 3/0262* (2013.01); *G01J 3/12* (2013.01); *G01J 3/2823* (2013.01); *G02B 5/208* (2013.01); *G02B 27/0018* (2013.01); *G02B 27/1006* (2013.01); *G02B 27/1013* (2013.01);
(Continued)

(58) Field of Classification Search
CPC  G02B 27/0018; G02B 27/10; G02B 27/1006; G02B 27/1013; G02B 27/14; G02B 27/141–27/149; G02B 5/20; G02B 5/208; G02B 5/26; G02B 5/28–5/283; G02B 2027/0114; G02B 6/29361;
(Continued)

(56) References Cited

U.S. PATENT DOCUMENTS 3,202,039 A 8/1965 De Lang et al.
4,412,723 A 11/1983 Shafer
(Continued)

FOREIGN PATENT DOCUMENTS

EP  1 083 554 A2  3/2001
EP  2 051 050 A2  4/2009
EP  2 163 870 A1  3/2010

*Primary Examiner* — Bumsuk Won
*Assistant Examiner* — Ephrem Mebrahtu
(74) *Attorney, Agent, or Firm* — Baker & Hostetler LLP

(57) ABSTRACT

A spectral splitting component is provided, having two faces, a planar front face comprising a dichroic treatment and a back face. It is intended to be placed downstream of a convergent objective. The back face is convex and forms a cylindrical surface defined by a generatrix of fixed direction moving perpendicularly along a circular arc comprising two ends, the plane passing through these two ends and parallel to the generatrix of the cylindrical surface forming a dihedral with the plane of the front face, the generatrix of the cylindrical surface being parallel to the edge of the dihedral.

10 Claims, 7 Drawing Sheets

(51) Int. Cl.
  *G02B 5/20* (2006.01)
  *G02B 27/10* (2006.01)
  *G01J 3/02* (2006.01)
  *G01J 3/28* (2006.01)
  *G02B 27/00* (2006.01)

(52) U.S. Cl.
  CPC .... *G02B 27/142* (2013.01); *G01J 2003/1213* (2013.01); *G01J 2003/2826* (2013.01)

(58) Field of Classification Search
  CPC ........ G01J 3/021; G01J 3/2823; G01J 3/0262; G01J 2003/1213; G01J 3/12; G01J 2003/2826
  See application file for complete search history.

(56) References Cited

U.S. PATENT DOCUMENTS

| | | |
|---|---|---|
| 4,541,688 A | 9/1985 | Watt et al. |
| 5,562,334 A | 10/1996 | Wortel |
| 6,611,383 B1 | 8/2003 | Lee |
| 7,502,117 B1 | 3/2009 | Wickholm |
| 8,309,905 B2 | 11/2012 | Blanc et al. |
| 2007/0137690 A1* | 6/2007 | Bruning .................... F24J 2/06 136/246 |
| 2008/0080059 A1 | 4/2008 | Dixon et al. |

\* cited by examiner

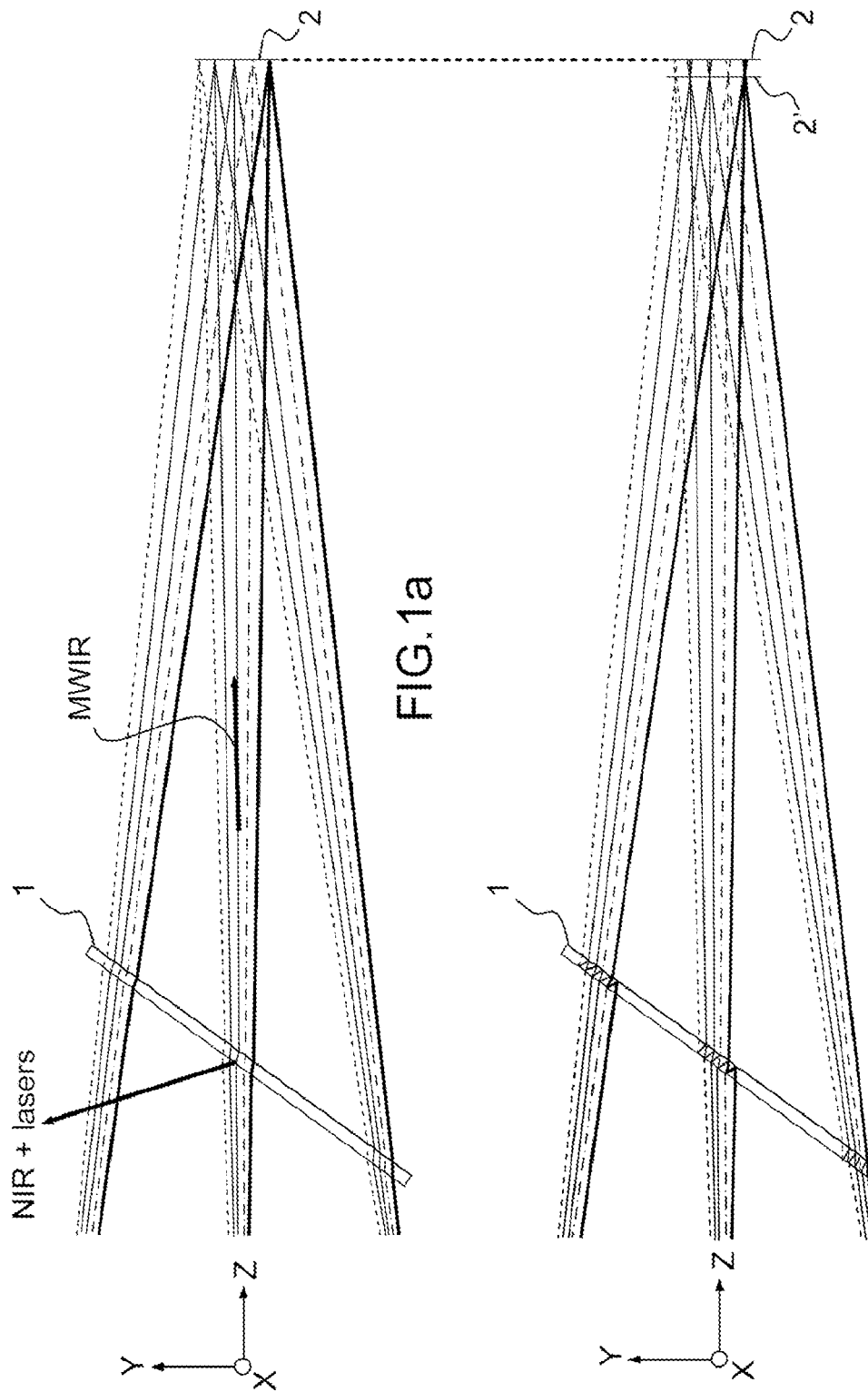

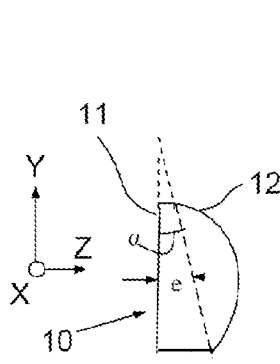
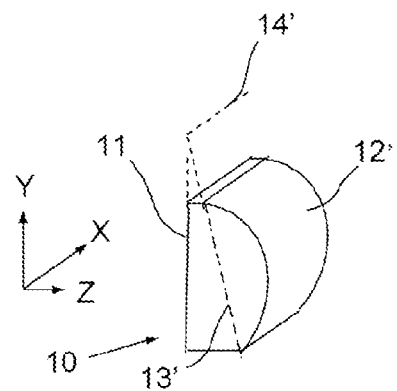
FIG.2a  FIG.2b
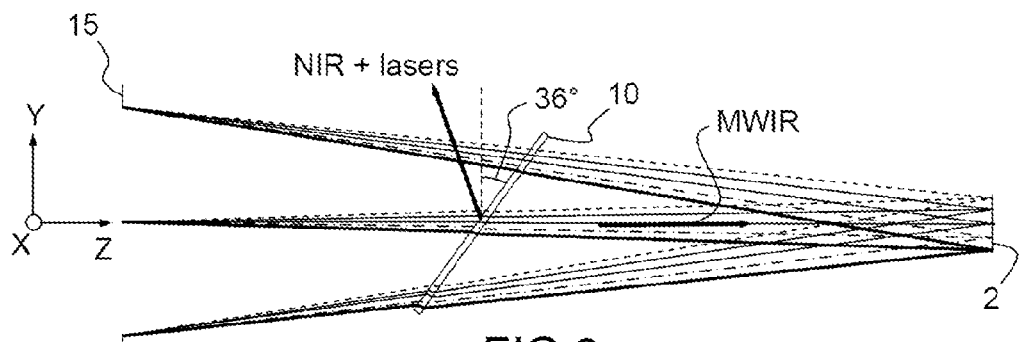
FIG.3
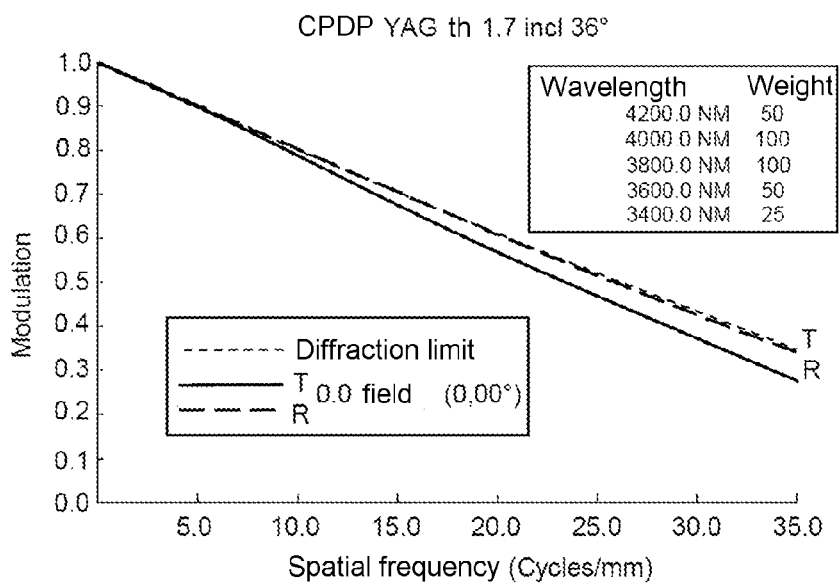
FIG.4a

SPECTRAL SEPARATION COMPONENT WITHOUT A VISIBLE GHOST IMAGE

CROSS-REFERENCE TO RELATED APPLICATIONS

This application is a National Stage of International patent application PCT/EP2013/074921, filed on Nov. 28, 2013, which claims priority to foreign French patent application No. FR 1203297, filed on Dec. 5, 2012, the disclosures of which are incorporated by reference in their entirety.

FIELD OF THE INVENTION

The field of the invention is that of mono-pupil multispectral optronic systems using matrix-array sensors, such as for example airborne reconnaissance pods, laser designation pods or the forward-looking optronic systems fitted to modern combat aircraft.

BACKGROUND

Generally, these systems associate an MWIR (3 µm-5 µm) imaging band with a visible (0.4 µm-0.7 µm) and/or NIR (0.7 µm-1.1 µm) and/or SWIR (1.4 µm-2.4 µm) imaging band, and laser channels, typically at 1.06 µm and/or 1.54 µm.

In such systems, it is naturally necessary to split spectrally the various channels using one or more spectral splitting components. It is a question here of the first splitting stage that for example transmits the MWIR band and reflects the other bands, the other splitting stages concerning the splitting of the other bands reflected by this first stage.

The only viable solution consists in transmitting the MWIR band and reflecting shorter wavelengths. This is because the solution consisting in reflecting the MWIR and transmitting the shorter wavelengths is reputed to be unfeasible, or at least particularly difficult to implement on account of the complexity of the thin-film stack allowing this function to be provided.

Splitting using a dichroic plate into parallel beams downstream of an afocal frontal system would appear at first glance to be advantageous because it does not produce any parasitic images or aberrations. In contrast, it requires many multispectral components upstream of the splitter in order to form the frontal afocal system, this more than offsetting its advantages.

To guarantee the optics retain a satisfactory degree of compactness and to optimize their transmission in each of the channels, it may be more judicious to split the incident beam into beams that converge, just downstream of the focal point of the multispectral head objective. The upstream-downstream direction is that of the light propagating in the system.

In summary, a spectral splitting component is sought that:
transmits the MWIR band and reflects bands of shorter wavelengths: visible (0.4 µm-0.7 µm) and/or NIR (0.7 µm-1.1 µm) and/or SWIR (1.4 µm-2.4 µm);
works with convergent beams;
does not degrade the modulation transfer function (MTF), either in transmission or in reflection; and
does not create a visible parasitic image, in particular in the MWIR band.

Dichroic plates and sets of splitter prisms are known techniques for splitting convergent beams, and these techniques will be described in succession.

A dichroic plate 1 is used in a system at an angle of inclination to its optical axis Oz, this angle of inclination typically being between 30° and 45° as shown in FIGS. 1a and 1b. The optical axis in fact follows a zigzag line and comprises an optical axis Oz incident on the plate and an optical axis refracted by the plate.

The plate is generally made of silicon (Si), germanium (Ge), zinc sulfide (ZnS) or zinc selenide (ZnSe).

The dichroic front face reflects the short portion of the spectrum (visible or NIR or SWIR) and transmits the long portion (MWIR) as illustrated in FIG. 1a by the arrows; the back face is simply given an MWIR anti-reflection treatment. It will furthermore be noted that in the intermediate focal plane 2, the plate clearly shifts the useful beams downward relative to the incident optical axis.

If the plate has planar and parallel faces, the two internal reflections produce a parasitic MWIR image that is slightly unfocused (focused on the plane 2' instead of on the plane 2) and shifted considerably upward relative to the main image, as shown in FIG. 1b, in which the useful beams of FIG. 1a are not shown in order to avoid cluttering the figure. Thus, it will be understood that a poorly contrasted zone of interest located in the scene in the vicinity of a bright object may be masked by the parasitic image of this object.

By comparing the two preceding figures, it may be seen that the plate separates the useful beams from the parasitic beams. By thinning the component, the parasitic image is brought closer to the main image, which is a good thing; however, it is necessary to preserve a certain thickness in order to keep deformation of the component (notably during operation) within acceptable limits, and the advantage gained remains insufficient.

Furthermore, the inclination of the plate to the incident beam produces aberrations, namely coma and astigmatism, in the transmitted wavefront; the severity of these two effects increases with the thickness of the plate. By making the plate slightly prismatic and correctly orienting the prism to the beam, i.e. by arranging the plate so that, relative to the incident optical axis Oz, the back face of the plate is more inclined than the front face, it is possible to decrease substantially—or even considerably—these aberrations. Unfortunately, the orientation of the prism allowing the aberrations to be decreased further separates the parasitic image from the main image, relative to a simple plate with planar and parallel faces, thereby making it more visible, and thus more problematic. This is illustrated in FIG. 1c for a 1.7 mm-thick dichroic plate made of YAG, working at F/4.0, this plate being inclined at 36° to the optical axis of a system equipped with this plate. The weighted polychromatic MTF calculated in transmission in the band 3.4 µm-4.2 µm in the radial direction (R) and in the tangential direction (T) is practically diffraction limited, as shown in FIG. 1d. In order not to clutter this figure, only the response at the centre of the field has been shown, but it is easy to show that the MTF remains uniform in a field of 12 mm diameter, compatible with use with a matrix-array detector.

A simplified version having two outputs of the splitter prism assembly described in FIG. 3 of U.S. Pat. No. 3,202,039 allows the need described above to be met. As an adhesive that is sufficiently transparent in the MWIR band does not exist, the two constituent prisms must be separated by a thin air gap. Furthermore, the inclination of the beams to the internal dichroic surface means that the two prisms must be made from an optical material of low refractive index—typically lower than 1.7—in order to prevent any total reflection of the MWIR beams in this location. Given the envisioned useful spectral bands, this condition greatly restricts the choice of materials. In practice, only fluorine (=CaF$_2$), which has an index of about 1.4, but is fragile and difficult to implement, may be used for this application. Furthermore, as this material has a high coefficient of expansion, deposition of the complex stack of thin films required for the dichroic function is subject to very variable production yields. Lastly, the assembly of the two prisms is particularly difficult. In brief, this solution is not truly an industrial solution and is furthermore very expensive.

Other solutions have been developed, notably those described in the following patents.

U.S. Pat. No. 4,412,723 describes an aberration corrector placed behind a plate with planar and parallel faces. But it does not suppress parasitic images.

U.S. Pat. No. 4,541,688 describes a device that meets the need for linear-array type detectors, but is absolutely not usable with matrix arrays; specifically, in that patent the problem addressed is solved by increasing the thickness of the plate so as to make the parasitic image depart from the field of the linear array, and the aberrations introduced by this extra thickness are corrected using additional components. To achieve the same result with a matrix-array detector, it would be necessary to increase inordinately the thickness of the component, which would make it more difficult or even impossible to correct the resulting aberrations.

U.S. Pat. No. 7,502,117 B1 describes a two-wave Michelson-type interferometer, the splitter and compensator of which comprise at least one non-planar surface in order to destroy interference between the various parasitic waves produced by the two components. The compensator and the splitter have the same power and are not prismatic.

EP 1 083 554 B1/U.S. Pat. No. 6,611,383 B1 describes correction of astigmatism using a prismatic plate, but parasitic images are not suppressed.

SUMMARY OF THE INVENTION

The aim of the invention is to mitigate these drawbacks. Thus, at the present time there remains a need for a spectral splitting component that satisfactorily addresses all of the aforementioned requirements, in terms of the parasitic image seen with convergent beams (notably in the MWIR band), of aberrations, of MTF, of cost and of ease of manufacture.

One subject of the invention is a spectral splitting component having two faces, a planar front face comprising a dichroic treatment and a back face. It is primarily characterized in that the back face is convex and forms a cylindrical surface defined by a generatrix of fixed direction moving perpendicularly along a circular arc comprising two ends, the plane passing through these two ends and parallel to the generatrix of the cylindrical surface forming a dihedral with the plane of the front face, the generatrix of the cylindrical surface being parallel to the edge of the dihedral.

In other words, it is a question of a convex, cylindrical and slightly prismatic spectral splitting component for spectral splitting of convergent beams.

The prismaticity angle of the component (=the angle of the dihedral) is optimized so as to shift the parasitic image formed by the 2 faces of the component back under the diffraction spot of the main MWIR image; for this purpose, the prism is oriented in the wrong direction from the point of view of aberrations, perfectly contradictory to the prior art, and thus introduces a large amount of coma and astigmatism into the wavefront, instead of correcting these aberrations. The slightly cylindrical convex back face of the spectral splitting component allows the aberrations introduced by the prismaticity of the component to be compensated for.

The planar front face of the spectral splitting component bears the dichroic treatment, and the cylindrical back face is simply given an MWIR anti-reflection treatment.

In fine, this solution is less expensive than a set of splitter prisms, easier to produce and equally effective.

Another subject of the invention is a mono-pupil multi-spectral optronic system intended to form an image of an object, and comprising on its optical axis:
a convergent objective;
a spectral splitting component such as described, inclined to the optical axis at a preset angle of inclination; and
a matrix-array detector;
characterized in that, the optical axis of the system taking the form of a zigzag line with an optical axis incident on the spectral splitting component and an optical axis refracted by the component, the component is inclined about the axis parallel to the generatrix of the cylindrical surface passing through the intersection of the incident optical axis with the planar front face, and the angle of inclination is such that the back face of the component is less inclined to the incident optical axis than the front face, so that, the image comprising a main image taking account of diffraction and a parasitic image formed by double reflection in the spectral splitting component, the parasitic image is shifted back under the diffraction spot of the main image.

BRIEF DESCRIPTION OF THE DRAWINGS

Other features and advantages of the invention will become apparent on reading the following detailed description, which is given by way of nonlimiting example and with reference to the appended drawings, in which:

FIGS. 1a-1d, which have already been described, schematically show a dichroic plate designed for convergent beams, said plate being inclined to the optical axis, with the intermediate focal plane on which the main image forms (FIG. 1a) and the intermediate focal plane on which the parasitic image forms (FIG. 1b); and the results obtained for a system equipped with such a plate (PDP standing for prismatic dichroic plate): a graph (FIG. 1c) detailing the distribution of illumination in the intermediate focal plane for the geometric image of the source, the image of the source taking account of diffraction, and the parasitic image of the source; and (FIG. 1d) the weighted MWIR MTF calculated at the centre of the transmission field, and the diffraction limit;

FIGS. 2a and 2b schematically show an example of a spectral splitting component according to the invention, seen in cross section (FIG. 2a) and en perspective (FIG. 2b);

FIG. 3 schematically shows an example of a spectral splitting component designed for convergent beams inclined to the optical axis of the system, according to the invention;

FIGS. 4a-c illustrate the results obtained for a system equipped with a first example of a spectral splitting component (CPDP standing for cylindrical prismatic dichroic plate) according to the invention, taking the form of a weighted MWIR MTF calculated at the centre of the transmission field compared to the diffraction limit (FIG. 4a); and of graphs giving the distribution of illumination in the intermediate focal plane for the geometric image, the image taking account of diffraction and the parasitic image of a disc of 0.5 mm diameter (FIG. 4b) and 0.05 mm diameter (FIG. 4c);

From one figure to another, the same elements have been given the same references.

DETAILED DESCRIPTION

Figure 1C:
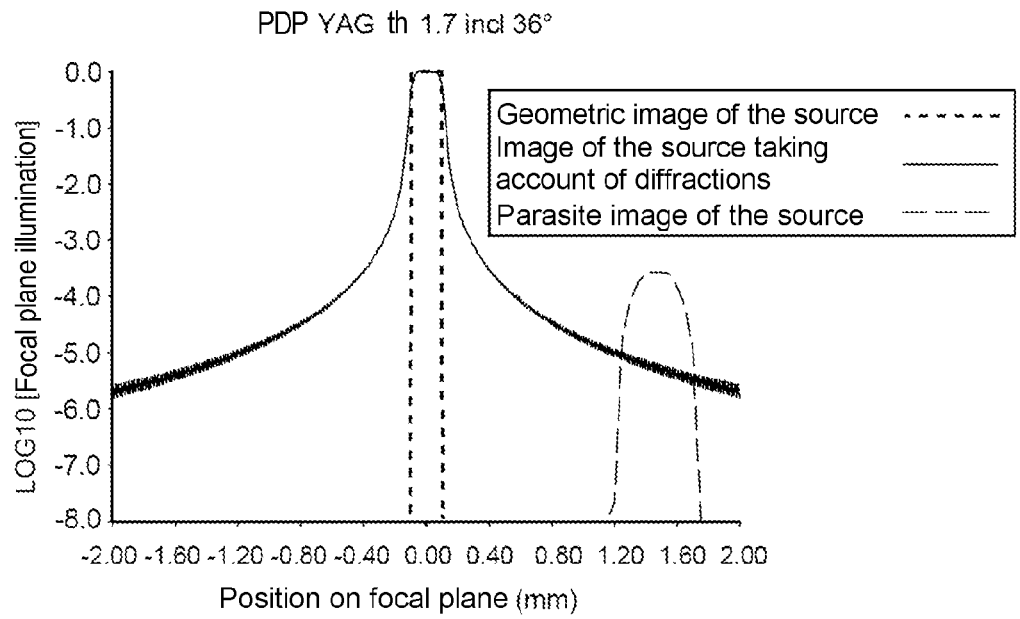
Figure 1D:
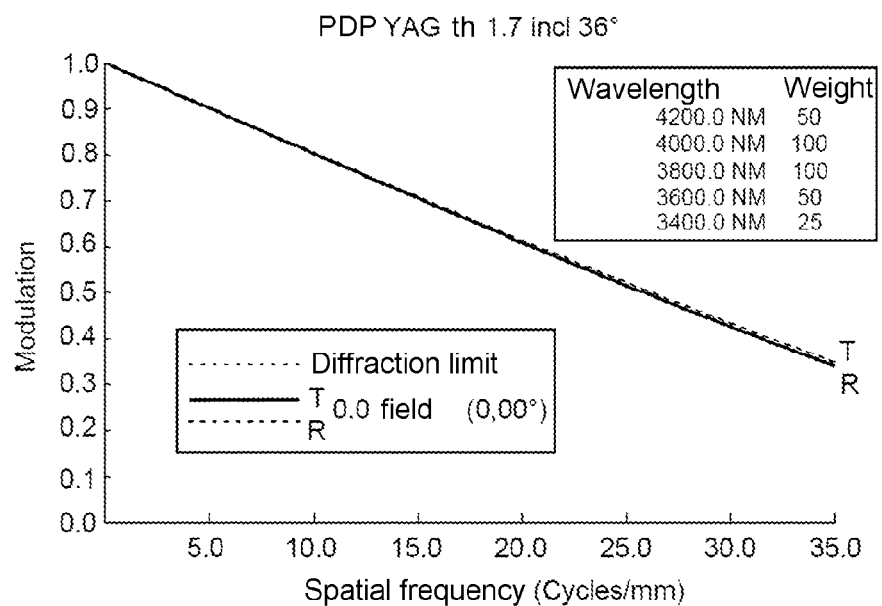

An example spectral splitting component 10 according to the invention is described with regard to FIGS. 2a and 2b (which are not to scale).

It comprises a planar spectral splitting (or dichroic) front surface 11 and a convex cylindrical back surface 12'.

The dichroic treatment is typically able to transmit wavelengths comprised between 3 μm and 5 μm and optionally able to reflect wavelengths shorter than 3 μm or longer than 8 μm.

The cylindrical surface 12' is defined by a generatrix of fixed direction moving perpendicularly along a circular arc 12 (very accentuated in these figures) having two ends. The plane 13' passing through the two ends of the circular arc and parallel to the generatrix of the cylindrical surface forms a dihedral with the plane of the front face 11 (this dihedral being very accentuated in these figures), the generatrix of the cylindrical surface being parallel to the edge 14' of the dihedral. For practical reasons, the apex of the dihedral is generally removed.

The average thickness "e" of the spectral splitting component is as small as possible, within reasonable limits, i.e. so that the component keeps its shape during fitting and operation, and typically has a diameter:thickness ratio comprised between 14 and 36. In FIG. 2b, the front face 11 of the spectral splitting component 10 is rectangular in order to make the figure easier to understand, but the invention is not limited to this case; it may notably be circular and of diameter D.

The angle α of the dihedral is adjusted so as to drown the parasitic image under the diffraction spot of the transmitted main image, this amounting to orienting the prism in the wrong direction from the point of view of aberrations. It is not necessary to superpose rigorously the parasitic image and the direct image in order to mask it. This allows the aberrations introduced by the prism to be limited, which aberrations are then more easily compensated for by the cylinder.

The aberrations induced by the prism are corrected by the convex cylindrical back face.

Generally, the angle α of the prism and the radius of curvature of the cylindrical back face (=radius of the circular arc 12) depend on the geometric extent of the MWIR beam, on the angle of inclination of the component to the optical axis of the system in which it is placed, on its refractive index, on its thickness, on the position of the pupil and on the position of the component relative to the focal plane. The larger the angle of inclination, the more difficult it becomes to find a satisfactory compromise between the quality of the transmitted wavefront and the concealment of the parasitic image.

The two parameters—prismaticity and radius of curvature of the circular arc—are determined experimentally or optimized using an optical design software package such as the software packages ZEMAX™ or Code V™. The angle of the dihedral is typically comprised between 0.4 mrd and 2 mrd; the circular arc typically has a radius of curvature comprised between 10 m and 100 m.

The back face 12' is advantageously given an antireflection treatment.

Preferably, the spectral splitting component is made of a material having a high refractive index, typically higher than 1.65, and is sufficiently stiff not to deform during fitting and operation. Specifically, a high index promotes the alignment of the parasitic image and the main image, and limits aberrations; a high stiffness allows the thickness of the component to be decreased, thereby naturally bringing the parasitic image and the main image further into alignment and attenuating aberrations.

Thus, logical candidate materials are for example silicon (Si), YAG ($Y_3Al_5O_{12}$), spinel ($MgAl_2O_4$), $Al_{23}O_{27}N_5$ designated by the commercial trade name ALON™, and magnesium oxide (MgO). Materials of lower stiffness, such as zinc sulfide (ZnS), zinc selenide (ZnSe), germanium (Ge), or gallium arsenide (GaAs) may nevertheless be used, with suitable thicknesses.

A mono-pupil multispectral optronic system using a matrix-array sensor and comprising a spectral splitting component such as described above will now be considered. The spectral splitting component 10 is inclined at an angle of 36° to the optical axis Oz of the system about the axis parallel to the generatrix of the cylindrical surface 12' passing through the intersection of the incident optical axis with the planar front face 11. The apex of the dihedral points upward (into the quadrant YoZ where Y and Z are positive) if the component deflects downward as shown in FIG. 3. It is located downstream of a convergent frontal multispectral objective that is assumed to be perfect (not shown in the figures) and that, in the MWIR band, works with an aperture of F/4 and an image field of 9.6 mm×7.2 mm, i.e. a diagonal of 12 mm. The pupil 15 is located about 220 mm upstream of the focal plane 2 of the objective, and the component 10 at about 130 mm.

In addition, in the MWIR, the parasitic reflectance of the front face 11 is assumed to be 7% and that of the back face 12' 1%, this being accessible with this type of component.

Obviously, this type of component does not introduce any aberration into the reflected beam. Therefore, to within manufacturing tolerances, the reflection MTF may be considered not to be degraded.

According to a first example embodiment, the spectral splitting component is made of YAG and has an average thickness "e" of 1.7 mm. The angle α of the dihedral is about 0.06° (=1.05 mrad). The back face 12' is convex and cylindrical with a circular arc radius of about 38 m.

Figure 4B:
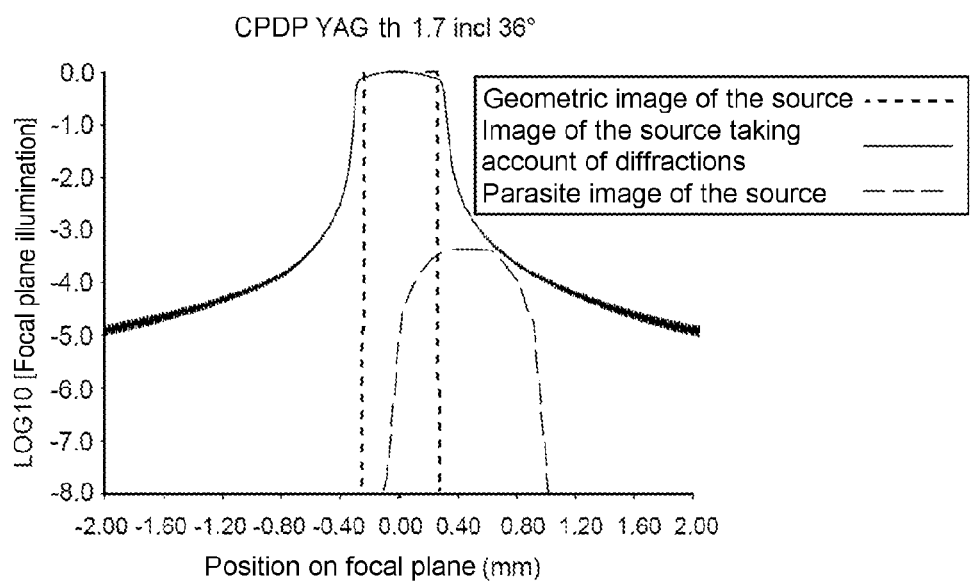
Figure 4C:
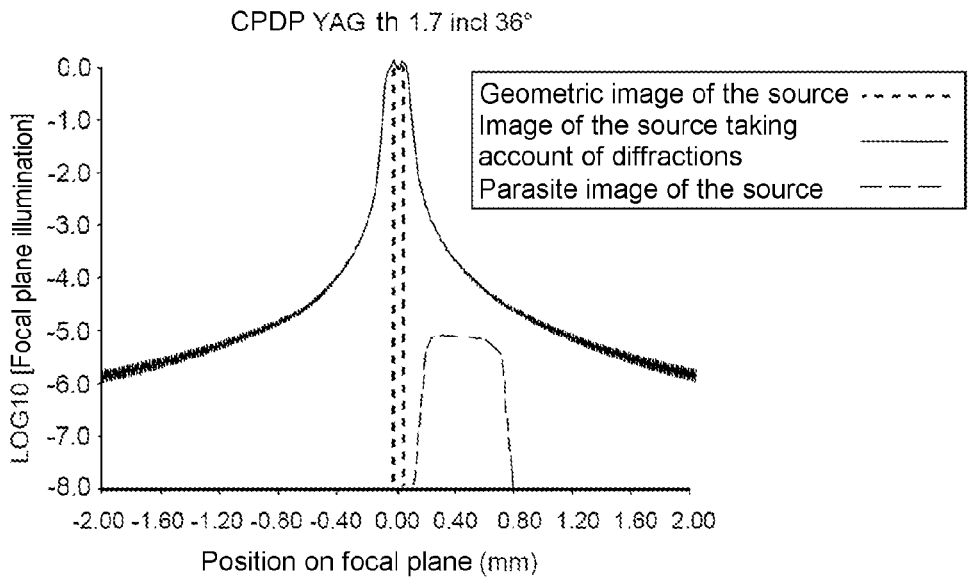

The weighted polychromatic MTF of the system equipped with this component, calculated in transmission in the band 3.4 μm-4.2 μm, is chromatism limited and is very close to the diffraction limit, as FIG. 4a shows for the centre of the field. This is true everywhere in the field, meaning that the spectral splitting component does not significantly degrade the optical MTF of the system at any point in the field. The offset between the barycenter of the parasitic image and the direct (or main) image is about 410 μm and this is enough to place the parasitic image under the diffraction of the direct image. The two FIGS. 4b and 4c illustrate this, for images of a disc of 0.5 mm diameter and for images of a disc of 0.05 mm diameter, respectively.

According to a second example embodiment, the spectral splitting component is made of silicon and has an average thickness of 3 mm. The angle α of the dihedral is about 0.04° (=0.7 mrad). The back face 12' is convex and cylindrical with a circular arc radius of about 83 m.

Figure 5A:
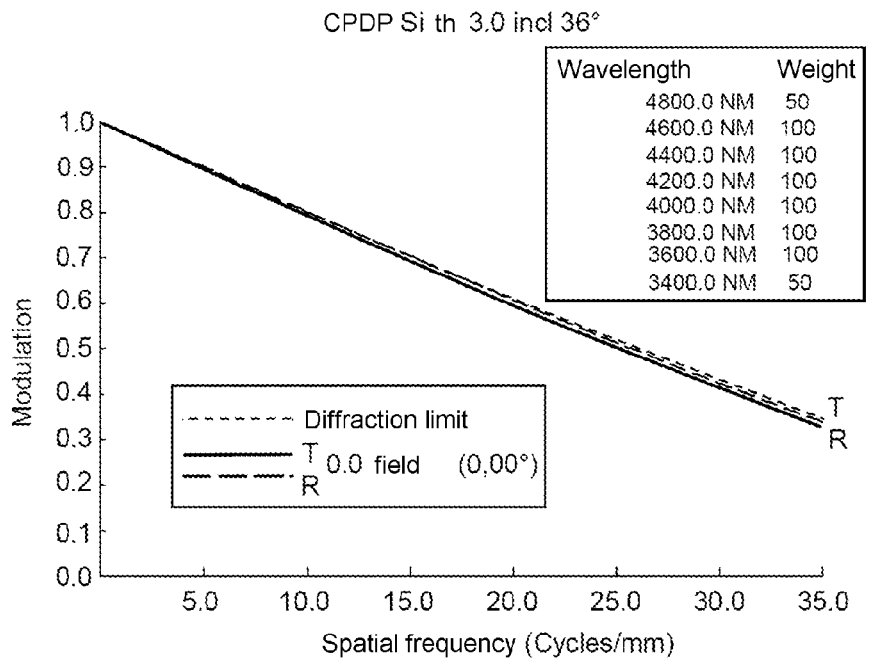
FIGS. 5a-5c illustrate the results obtained for a system equipped with a second example of a spectral splitting component (CPDP standing for cylindrical prismatic dichroic plate) according to the invention, taking the form of a weighted MWIR MTF calculated at the centre of the transmission field compared to the diffraction limit (FIG. 5a); and of graphs giving the distribution of illumination in the focal plane for the geometric image, the image taking account of diffraction and the parasitic image of a disc of 0.5 mm diameter (FIG. 5b) and 0.05 mm diameter (FIG. 5c)

As in the preceding example, the weighted MTF of the system equipped with this component, calculated in the band 3.4 μm-4.8 μm in transmission, is very close to the diffraction limit, as shown in FIG. 5a for the centre of the field; and the same applies to everywhere in the field.

Figure 5B:
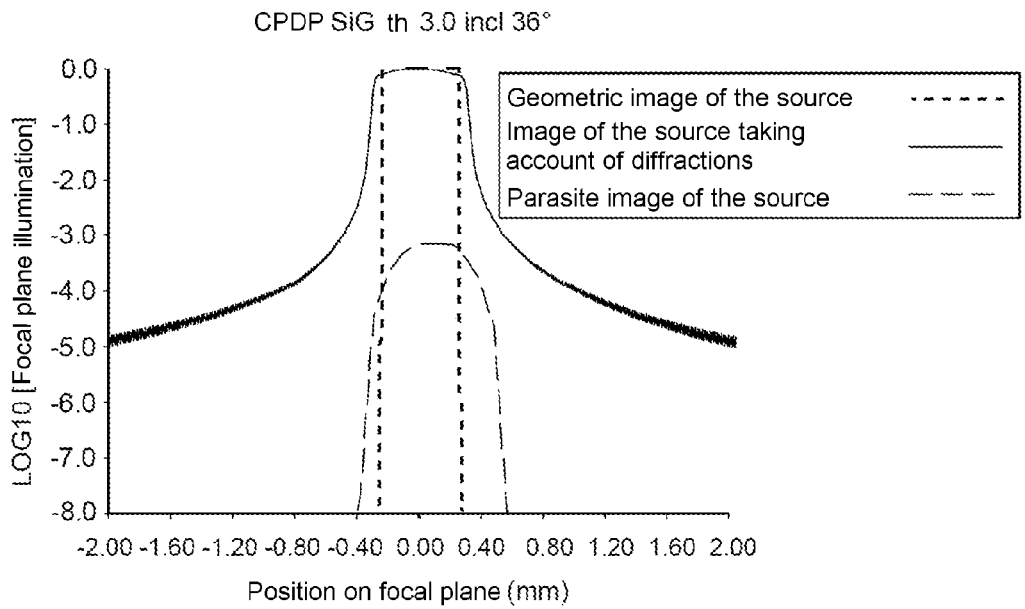
Figure 5C:
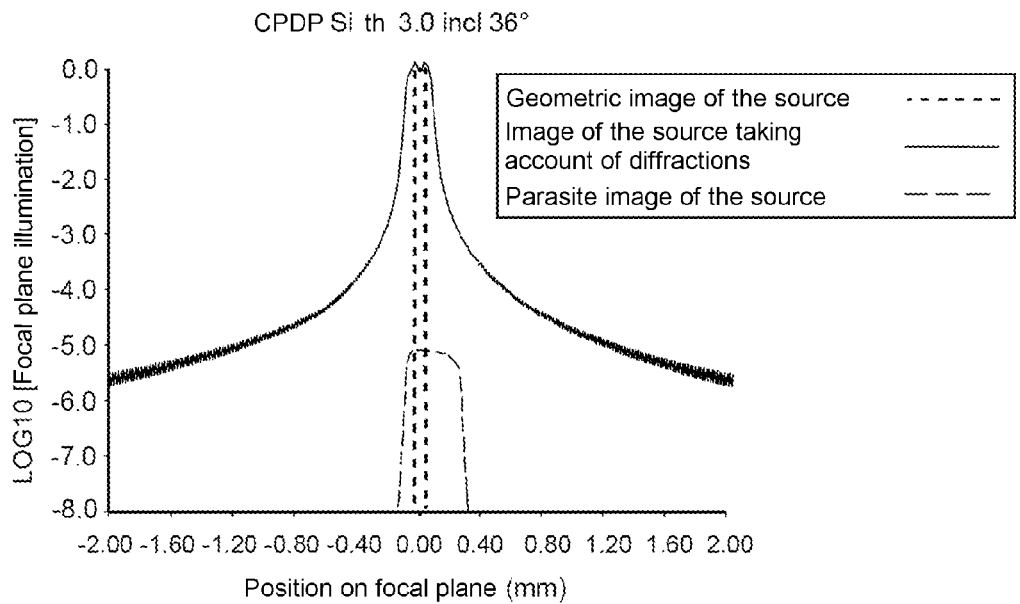

The offset between the barycenter of the parasitic image and the direct (or main) image is about 86 μm and this is more than enough to place the parasitic image under the diffraction of the direct image. The two FIGS. 5b and 5c illustrate this, for images of discs of 0.5 mm diameter and of 0.05 mm diameter, respectively.

According to a third example embodiment, the spectral splitting component is made of zinc sulfide and has an average thickness of 3.3 mm. The angle α of the dihedral is about 0.08° (=1.4 mrad). The back face 12' is convex and cylindrical with a circular arc radius of about 34 m.

Figure 6A:
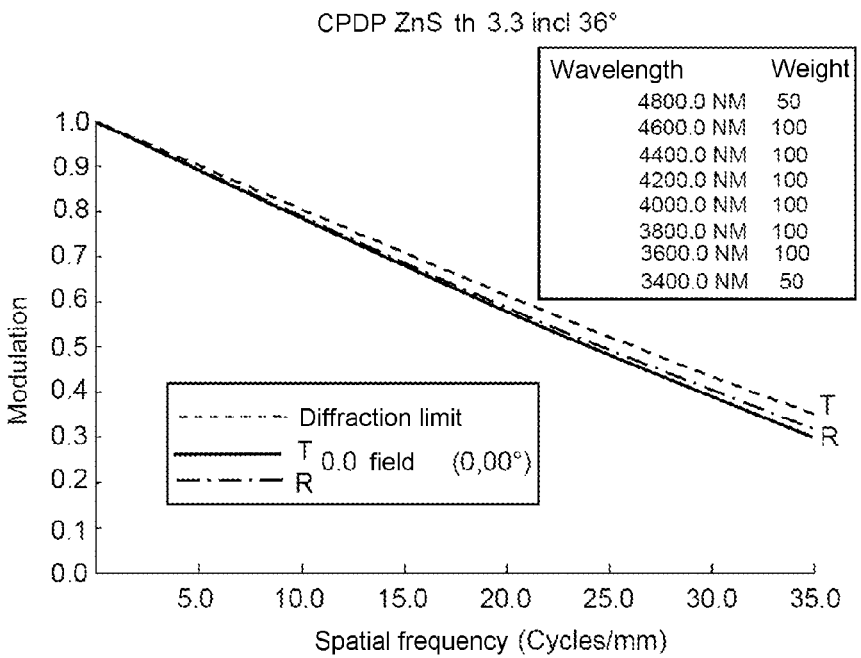
FIGS. 6a-6c illustrate the results obtained for a system equipped with a third example of a spectral splitting component (CPDP standing for cylindrical prismatic dichroic plate) according to the invention, taking the form of a weighted MWIR MTF calculated at the centre of the transmission field compared to the diffraction limit (FIG. 6a); and of graphs giving the distribution of illumination in the focal plane for the geometric image, the image taking account of diffraction and the parasitic image of a disc of 0.5 mm diameter (FIG. 6b) and 0.05 mm diameter (FIG. 6c).

As in the preceding example, the weighted MTF of the system equipped with this component, calculated in the band 3.4 μm-4.8 μm in transmission, is very close to the diffraction limit, as shown in FIG. 6a for the centre of the field; and the same applies to everywhere in the field.

Figure 6B:
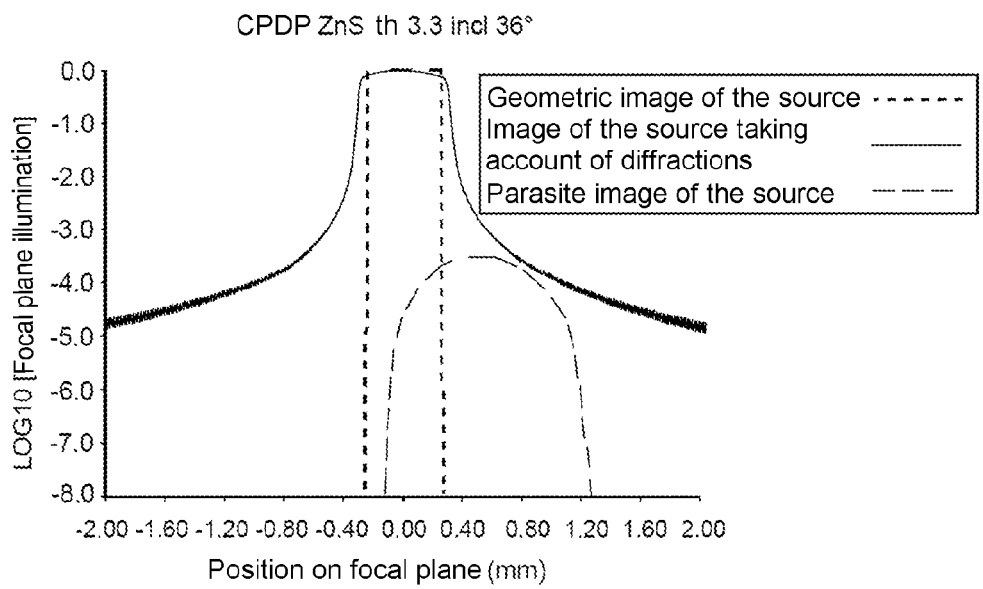
Figure 6C:
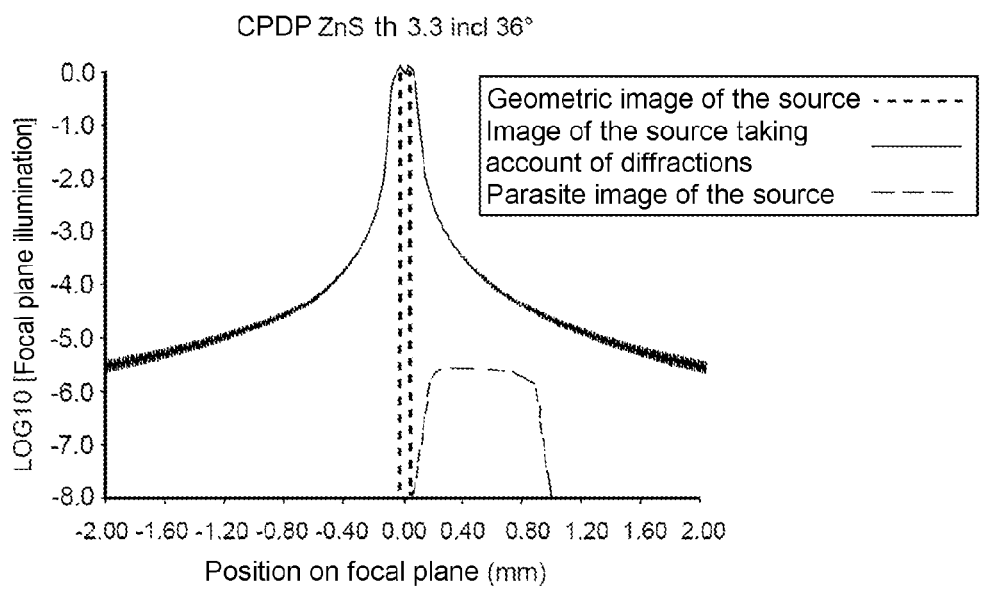

The offset between the barycenter of the parasitic image and the direct image is about 450 μm and this is more than enough to place the parasitic image under the diffraction of the direct image. The two FIGS. 6b and 6c illustrate this, for images of discs of 0.5 mm diameter and of 0.05 mm diameter, respectively.

The invention claimed is:

1. A spectral splitting component having two faces, a planar front face comprising a dichroic treatment and a back face, wherein the back face is convex and forms a cylindrical surface defined by a generatrix of fixed direction moving perpendicularly along a circular arc comprising two ends, a plane passing through these two ends and parallel to the generatrix of the cylindrical surface forming a dihedral with the plane of the front face, the generatrix of the cylindrical surface being parallel to the edge of the dihedral.

2. The spectral splitting component as claimed in claim 1, wherein the back face is given an antireflection treatment.

3. The spectral splitting component as claimed in claim 1, characterized in that the dichroic treatment is able to transmit wavelengths comprised between 3 μm and 5 μm.

4. The spectral splitting component as claimed in claim 3, wherein the dichroic treatment is able to reflect wavelengths shorter than 3 μm.

5. The spectral splitting component as claimed in claim 1, wherein the component is circular and of diameter D and has a thickness e such that D/e is comprised between 14 and 36.

6. The spectral splitting component as claimed in claim 1, wherein the angle of the dihedral is comprised between 0.4 mrd and 2 mrd.

7. The spectral splitting component as claimed in claim 1, wherein the circular arc has a radius of curvature comprised between 10 m and 100 m.

8. The spectral splitting component as claimed in claim 1, wherein the component is made of YAG or Si or aluminum on/nitride ($Al_{23}O_{27}N_5$) or Spinel or MgO or ZnS or ZnSe or Ge or GaAs.

9. A mono-pupil multispectral optronic system intended to form an image of an object, comprising on its optical axis:
    a convergent objective;
    a spectral splitting component as claimed in claim 1, inclined to the optical axis at a preset angle of inclination; and
    a matrix-array detector;
    wherein, the optical axis of the system taking the form of a zigzag line with an optical axis incident on the spectral splitting component and an optical axis refracted by the component, the component is inclined to the incident optical axis about the axis parallel to the generatrix of the cylindrical surface passing through the intersection of the incident optical axis with the planar front face, and the angle of inclination is such that the back face of the component is less inclined to the incident optical axis than the front face, so that, the image comprising a main image taking account of diffraction and a parasitic image formed by double reflection in the spectral splitting component, the parasitic image is shifted back under the diffraction spot of the main image.

10. The mono-pupil multispectral optronic system as claimed in claim 9, characterized in that the angle of inclination is comprised between 30° and 45°.

* * * * *

UNITED STATES PATENT AND TRADEMARK OFFICE
CERTIFICATE OF CORRECTION

PATENT NO. : 9,746,682 B2  
APPLICATION NO. : 14/649503  
DATED : August 29, 2017  
INVENTOR(S) : Bertrand Forestier et al.

Page 1 of 1

It is certified that error appears in the above-identified patent and that said Letters Patent is hereby corrected as shown below:

In the Claims

In Line 22, Column 8 in Claim 8, "on/nitride" should be --oxynitride--.

Signed and Sealed this
Third Day of October, 2017

Joseph Matal
*Performing the Functions and Duties of the*
*Under Secretary of Commerce for Intellectual Property and*
*Director of the United States Patent and Trademark Office*